July 29, 1924.  
A. L. DUGON  
1,503,353  
RECORDING PRESSURE GAUGE, INDICATOR, AND OTHER MEASURING INSTRUMENT  
Filed July 26, 1922  2 Sheets-Sheet 2
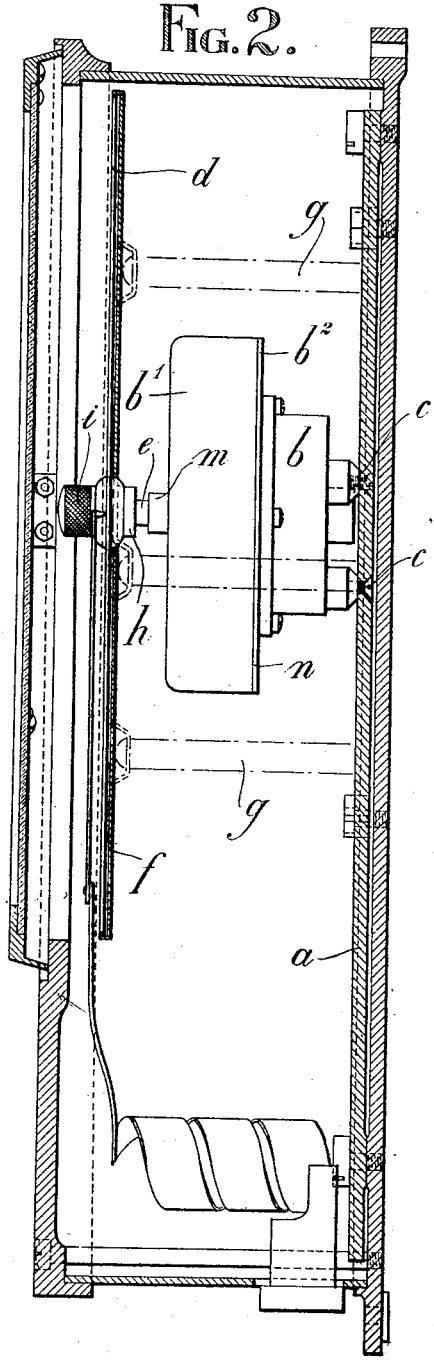
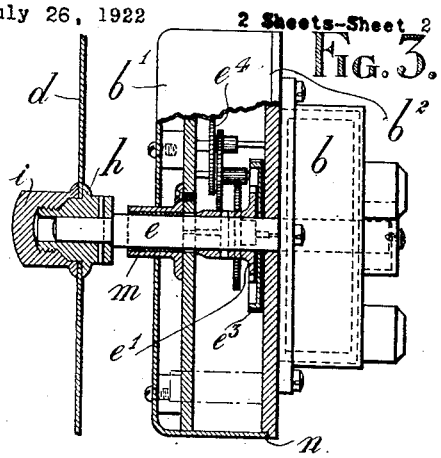
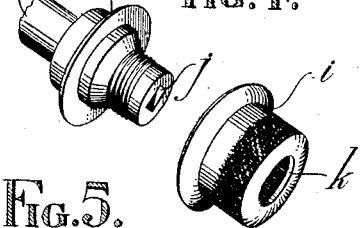
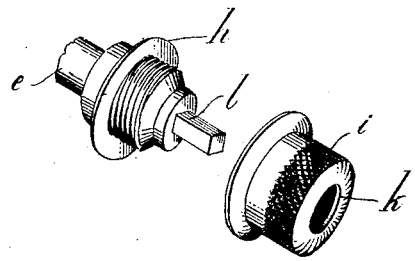
Alexander L. Dugon INVENTOR
BY *E. G. Siggers* ATTORNEY Patented July 29, 1924.

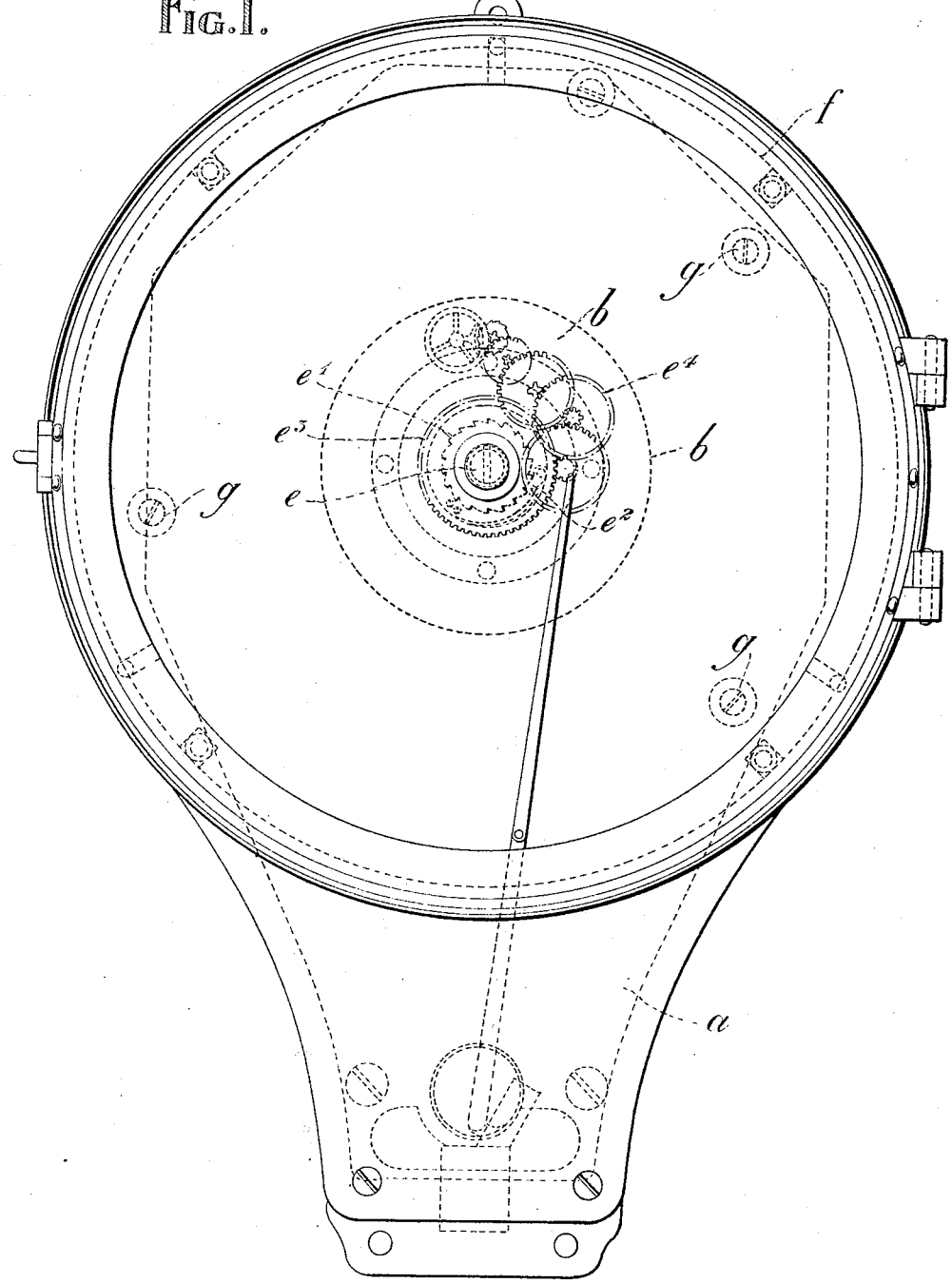

1,503,353

UNITED STATES PATENT OFFICE.

ALEXANDER L. DUGON, OF LONDON, ENGLAND.

RECORDING PRESSURE GAUGE, INDICATOR, AND OTHER MEASURING INSTRUMENT.

Application filed July 26, 1922. Serial No. 577,586.

*To all whom it may concern:*

Be it known that I, ALEXANDER LAMONT DUGON, a subject of the King of England, residing at 23 College Hill, in the city and county of London, Kingdom of England, have invented certain new and useful Improvements in or Relating to Recording Pressure Gauges, Indicators, and Other Measuring Instruments, of which the following is a specification.

This invention refers to improvements in or relating to recording pressure gauges, recording thermometers, electrical instruments, indicators and other measuring instruments, and has more particular reference to such instruments of the kind described in the specification of my prior British Letters Patent No. 25,986 of 1912, No. 13,710 of 1914, No. 108,775 and No. 162,582.

The primary object of the present invention is the provision of an instrument of the above kind in which the clockwork mechanism serving to drive the chart is constructed, arranged and combined therewith in an improved and simplified manner, whereby it is not necessary to remove or lift up the chart when winding the clockwork mechanism, and whereby moisture, water and dust are effectively excluded from the mechanism.

According to the present invention I arrange the clockwork mechanism so that the chart driving spindle or member also serves for winding the said mechanism, the connection between the spindle and the chart permitting the spindle to be engaged to wind the clock mechanism without tightening or otherwise affecting the clamping and holding means between the chart and the spindle.

In order that the present invention may be clearly understood and more readily carried into effect it is hereinafter described with reference to the accompanying drawings, in which:—

Figure 1 is a front elevation of a recording pressure gauge having the chart rotating clockwork mechanism arranged in accordance with the present invention;

Figure 2 is a sectional side elevation of said gauge;

Figure 3 is an enlarged detail view partly in section illustrating portions of the clockwork mechanism, and Figures 4 and 5 are perspective views showing convenient arrangements of the flanged boss and central spindle or chart hub and the chart clamping nut.

In carrying the present invention into effect the instrument may be of any preferred type having a pear-shaped, circular or other convenient or conventional type of case, and for convenience of the present description it is shown with a case of the general type and construction shown in the specification of my prior Letters Patent No. 162,582.

As shown, the instrument is provided with an interchangeable back $a$ to which the clockwork mechanism $b$ is attached by means of the three countersunk screws $c$. The said clockwork mechanism $b$ is so positioned on the interchangeable back $a$ that it occupies a central position in relation to the chart $d$, and the internal mechanism is so arranged or constructed that the central spindle or chart hub $e$ also serves as the winding arbor. The actual details of the clockwork may be varied as desired, as will be readily understood by clockmakers. In the particular construction shown the central spindle or chart hub $e$ is connected to the inner end of a driving spring the outer end of which is fixed to the interior of its case in the known manner. The spindle $e$ carries a ratchet wheel $e'$ which co-operates with a spring-controlled pawl $e^2$ carried by or inside a large spur wheel $e^3$ connected to a suitable train of escapement wheels. Thus the spindle $e$ as shown would be turned to the right or clockwise when winding, leaving the escapement train $e^4$ free, and to the left or anti-clockwise when rotating the chart and actuating the escapement train. The chart $d$ is supported in the known manner on a fixed disc $f$ which latter is supported by pillars $g$ secured to the back $a$ in such a manner that the clockwork spindle $e$ passes out through a hole provided centrally therein. At its outer end the spindle $e$ is provided with the usual flanged boss $h$ adapted to co-operate with the clamping nut $i$ for securing the chart $d$ in position.

In carrying the present invention into effect in the simplest manner, that shown in Figures 1, 2 and 3, the flanged boss $h$ and the clamping nut $i$ are of the usual type and the winding of the clockwork motor is effected by simply gripping the knurled portion of the said clamping nut in between the thumb and finger as when securing the chart in position. The above described method of winding the spindle *e* through the clamping nut *i*, however, possesses the slight disadvantage that the operation of winding the clockwork mechanism also serves to tighten the clamping nut on to the chart and the flanged boss on the spindle to an inconvenient degree, or in other words, the nut becomes tightened by this process to such an extent that its loosening which is requisite for the re-setting of the chart cannot easily be effected. To avoid this drawback means may be provided whereby the power required for winding the clockwork mechanism may be applied directly to the central spindle *e* or to the flanged boss *h* provided thereon.

In one suitable method of carrying this into effect the upper portion of the flanged boss *h* may be provided with a squared recess *j*, as shown in Figure 4, for the insertion of a square winding bar or key which would be passed through a clearance hole *k* provided in the closed end of the clamping nut *i*. The recess *j* may if desired be formed in the end of the shaft *e*.

In a slightly modified arrangement, instead of providing the end of the flanged boss *h* or the shaft *e* as the case may be, with a recess, the boss *h* or the shaft *e* may be provided with a squared extension *l*, as shown in Figure 5, which may be reached by a clearance hole *k* also provided in the end of the clamping nut *i* as before or which may itself normally project through the said hole *k* in the said clamping nut. In this case an ordinary recessed clock-winding key would be employed.

It will be seen that the utilization of the central spindle *e* for purposes of winding the clockwork mechanism possesses several other advantages in addition to those previously described, inasmuch as it avoids the necessity for providing a separate winding hole in the face of the clockwork case and enables a case to be provided which is for all practical purposes entirely weatherproof. In the present construction the central spindle *e* passes out through the non-rotating sleeve *m* with which the cap or cover *b'* of the mechanism casing can make a tight joint. The cap or cover *b'* is also adapted at its free or flanged edge to make a closely sealed joint with the base member of the case $b^2$ at *n* by means of a groove or rebate provided therein or thereon.

What I claim is:—

1. In a recording device, the combination of a spindle, clock mechanism including a main spring connected to said spindle, a pawl and ratchet mechanism connected to said spindle and operated thereby, whereby the spindle is rotated under influence of the main spring, said spindle being rotatable in the opposite direction to wind up the spring, means mounted on the outer end of the spindle for clamping and holding a chart directly to and on the spindle so that the chart will rotate with the spindle, and means engaging with the arbor through the nut and independent of said clamping and holding means, whereby the outer end of said spindle may be engaged to wind the clock mechanism without tightening or otherwise affecting the said clamping and holding means.

2. In a recording device, the combination of a spindle, clock mechanism including a main spring connected to said spindle, a pawl and ratchet mechanism connected to said spindle and operated thereby, whereby the spindle is rotated under influence of the main spring, said spindle being rotatable in the opposite direction to wind up the spring, a flanged boss on the outer end of the spindle on which the chart is supported, so that the chart will rotate with the spindle, a clamping nut in threaded engagement with said boss and rotated independently of the spindle to clamp and hold the chart by friction against the flange of said boss, and means including a hole in the nut whereby the outer end of said spindle may be engaged to wind the clock mechanism, without tightening or otherwise affecting the nut.

In testimony whereof I have hereunto signed my name.

A. L. DUGON.